United States Patent [19]

Bergman et al.

[11] 4,286,569
[45] Sep. 1, 1981

[54] INTAKE AND DISCHARGE DUCT WITH EXTERNAL TERMINAL FOR A BURNER-OPERATED REFRIGERATOR

[75] Inventors: Ernst L. A. Bergman, Saltsjöbaden; Peter E. Blomberg, Stockholm; Lars S. Enger, Bandhagen; Bengt R. Reistad, Bromma; Sonny O. Wallgren, Ekerö, all of Sweden

[73] Assignee: Aktiebolaget Electrolux, Stockholm, Sweden

[21] Appl. No.: 118,111

[22] Filed: Feb. 4, 1980

[30] Foreign Application Priority Data

Feb. 2, 1979 [SE] Sweden ............................ 7900914

[51] Int. Cl.³ .................. F24C 3/00; F25B 15/00; B60H 3/04
[52] U.S. Cl. ...................... 126/85 B; 62/148; 62/239
[58] Field of Search ................. 62/148, 239; 431/341; 126/85 B; 110/175 R

[56] References Cited

U.S. PATENT DOCUMENTS

| | | | |
|---|---|---|---|
| 3,245,224 | 4/1966 | Wilkinson | 62/239 |
| 3,327,609 | 6/1967 | Sage et al. | 126/85 B |
| 3,512,371 | 5/1970 | Gurt et al. | 62/148 |
| 3,662,735 | 5/1972 | Jackson | 126/85 B |
| 3,771,320 | 11/1973 | Kenneryd et al. | 62/239 |
| 3,994,280 | 11/1976 | Winters et al. | 126/85 B |
| 4,129,408 | 12/1978 | Hammar | 126/85 B |
| 4,175,538 | 11/1979 | McCarty | 126/85 B |

Primary Examiner—Lloyd L. King
Attorney, Agent, or Firm—Alfred E. Miller

[57] ABSTRACT

An external intake-discharge duct for a burner-operated refrigerator having a sealed system. The intake communicates with the atmosphere outside of a trailer or a motor home and is located in a service door for the burner of a refrigerating apparatus. Atmospheric air is conducted downward through the air intake to the burner, and hot combustion gases are conducted upwards through a flue pipe and out through a discharge or outlet. The duct terminates in a cap-like structure located externally in a wall of a trailer or motor home.

4 Claims, 4 Drawing Figures

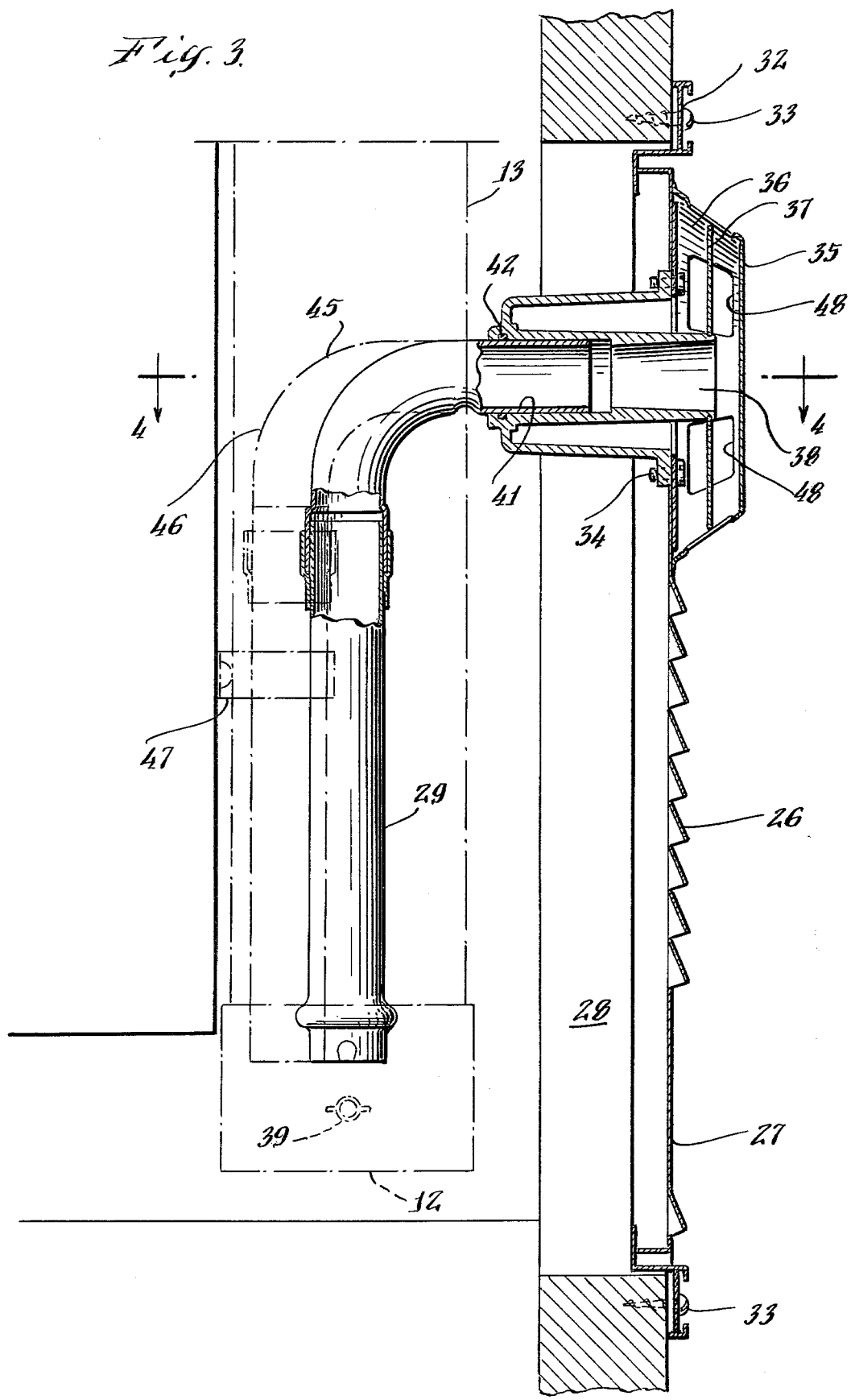

INTAKE AND DISCHARGE DUCT WITH EXTERNAL TERMINAL FOR A BURNER-OPERATED REFRIGERATOR

It is known for mounting of a burner-operated refrigerator in a trailer or motor home to make openings in the trailer wall, for example, one lower opening having its lower edge on the same level as the floor on which the refrigerator rests, and one upper opening at approximately equal height as the top part of the refrigerator, or somewhat above, or alternatively, through the roof of the trailer. In the lower opening, a vent louver is placed, which also serves as a service door, and through this louver fresh air is admitted for cooling the absorption refrigerating apparatus. Also in the upper opening a vent louver is placed through which the warm cooling air is discharged. For refrigerators with closed combustion systems, additional openings are required in the trailer wall, for example, an opening for the valve through which combustion air is to be let in, and combustion gases are to be discharged, respectively.

Generally speaking, there are no difficulties for a trailer manufacturer to make the lower opening for the lower vent louver. However, to make the opening for the upper vent louver involves difficulties, since on one hand this opening weakens the wall, and on the other hand often this opening coincides with decorative borders of the exterior of the trailer. Another difficulty is that the buyer of a trailer or motor home, as a rule, is permitted to choose any size of refrigerator and hence the location of the upper vent louver cannot be determined until the customer has indicated his or her choice of a refrigerator. Therefore, a certain compromise practice has been in use, which means that most trailer or motor home manufacturers choose to discharge the warm air through an opening in the roof, instead of discharging it through a side wall, although the former solution is more expensive.

Similar problems arise in trailers having refrigerators with closed combustion systems. With different heights of the refrigerators, an opening in the wall would necessarily be placed at different levels, and experience has shown that very often the opening will be located in the decorative border of the trailer which is rather unsightly. Up to the present, locating the opening through the roof has appeared to be the best solution to the problem. However, with a closed combustion system, this involves additional problems. For example, the combustion gas conduit has to be insulated to avoid forming condensation water, and the discharge valve must be at an unattractive height on the roof so as not to be blocked in the event of a heavy snow. The combustion gas conduit must also be made of stainless material to resist corrosion, which would otherwise be caused by the condensation products of the combustion gases discharged by the refrigerator.

The set-up operations before delivery to adapt the trailer or motor home to a refrigerator of a given size, and to make connections to the wall are time-consuming and costly.

It is a feature of the present invention to avoid the above drawbacks of known constructions and to provide an arrangement which makes it possible to make the trailer ready for manufacture, and which permits immediate and simple connection of a refrigerator to the trailer wall independently of the size of refrigerator selected by the customer, and without the need for a skilled person to make the connection.

The feature of the invention is preferably characterized by an external intake and discharge duct which passes through the wall of the trailer or motor home. The intake communicates with the outside atmosphere, while the discharge or gas outlet communicates through another section of the duct to the atmosphere. The duct is provided with a terminal which is disposed outside the wall of the trailer or motor home, and is located in the service door of the burner of the air conditioning apparatus.

It is to be understood that the present invention can be utilized in other types of recreational vehicles other than trailers and motor homes.

In order that the invention will be more clearly understood, it will now be disclosed in greater detail with reference to the accompanying drawings, in which:

FIG. 3 is a vertical sectional view taken along the lines III—III of FIG. 2, and FIG. 4 is a horizontal sectional view taken along the lines IV—IV of FIG. 2.

Figure 1:
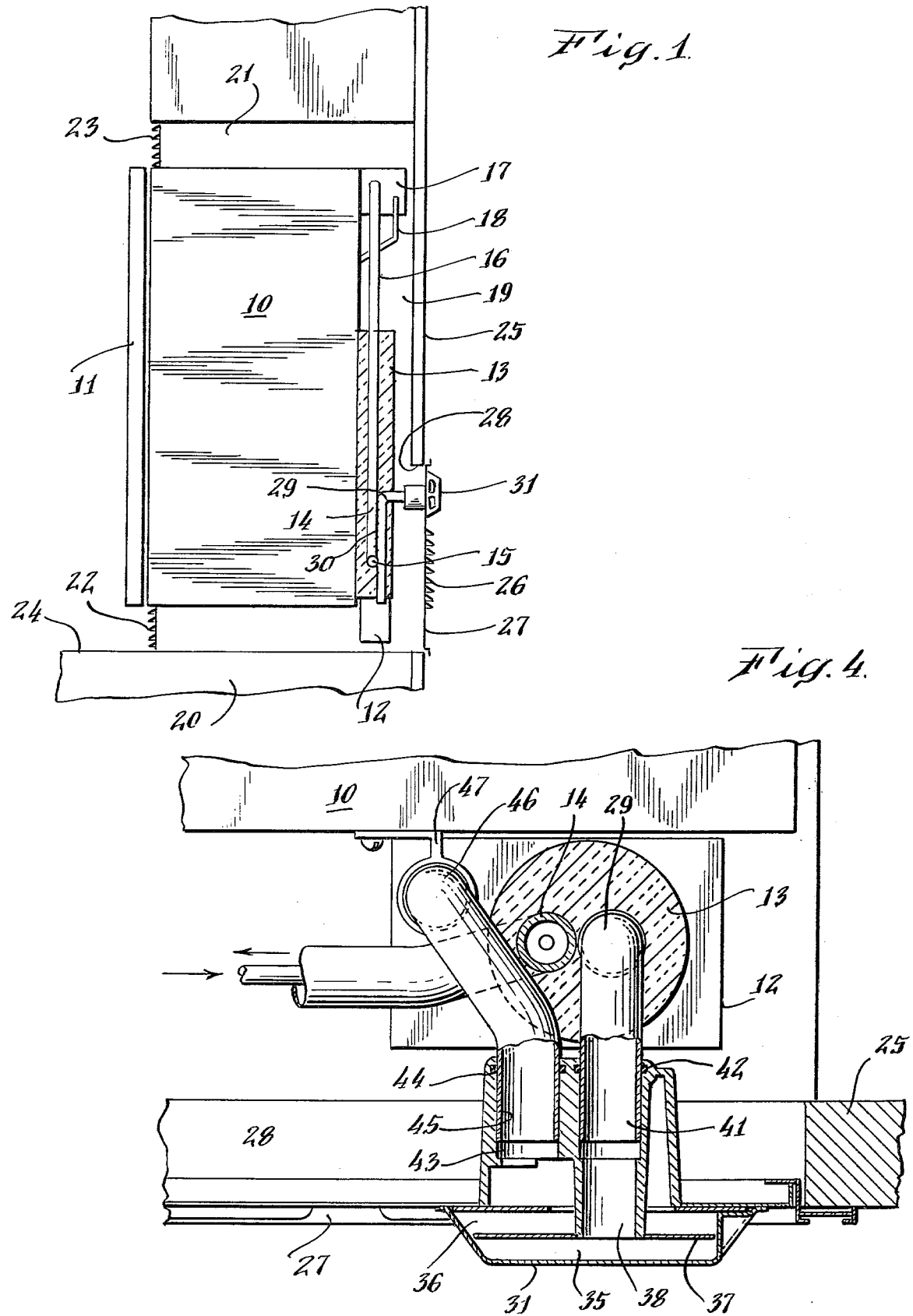
FIG. 1 is a vertical section through door and back of a refrigerator, and an exterior wall of a trailer or motor home.

FIG. 1 shows a refrigerator 10 mounted in the interior of a trailer or motor home. The refrigerator is an absorption refrigerating apparatus and is provided with a door 11. The apparatus is operated by a gas burner in the housing 12 and in a known manner, but may be alternatively provided with an electric heating cartridge. The burner housing 12 is located under a heat insulation 13 which surrounds the boiler system of the refrigerator apparatus. The boiler system shown is a so-called single-pipe boiler 14, and it communicates by means of a liquid heat exchanger 15 with the absorber system (not shown) of the refrigeration apparatus. A vapor conduit 16 leads from the boiler to the condenser, which has fins 17, and the refrigerant condensate formed in the condenser is conducted through a conduit 18 to the evaporator system of the apparatus (not shown). The heat emitting parts of the apparatus, i.e. the condenser and the absorber (not shown) have to be cooled, and therefore channels 21, 20 over and under the refrigerator 10 are provided respectively, which communicate with the apparatus space 19 at the rear of the refrigerator. These channels communicate by vent louvers 22 and 23 with the interior of the trailer or the like.

The floor 24 and the wall 25 of the trailer are shown in FIG. 1. Cooling air to the apparatus space 19 may also pass through a vent louver 26 in a service door 27, which covers an opening 28 in the wall 25 of the trailer, and extends upwards from the level of the floor 24, and its lateral extension corresponds to the width of the refrigerator. The door 27 can be opened or removed, and thus the gas conduits and the control means for the apparatus become accessible for service and repair.

The gas burner in the housing 12 is disposed under a flue pipe 29 which has the same size and form in refrigerators of different sizes. In addition, the flue pipe 29 is joined to the boiler 14 by a weld 30, or in some other manner. However, on manufacture, this heat-conductive connection is adapted to the size of the particular refrigerating apparatus. The flue pipe 29 is bent at right angles over the heat-conductive connection and directed straight rearwards of the refrigerator. This part of the pipe is therefore at the same height above the floor 24, and in the same position, independently of what refrigerator is placed in the space provided therefor in the trailer or the like.

When the refrigerator is being mounted in the trailer the flue pipe 29 is connected to the valved intake and valve 31 placed in the door 27. Thus, the door with the valve arrangement can be fabricated and assembled in the factory, and on mounting, need not be placed at different locations in different trailers or the like. The valve 31 also includes connections (not shown) in FIG. 1, for supply of air to the burner. These parts generally appear in FIGS. 2-4, on an enlarged scale.

Figure 2:
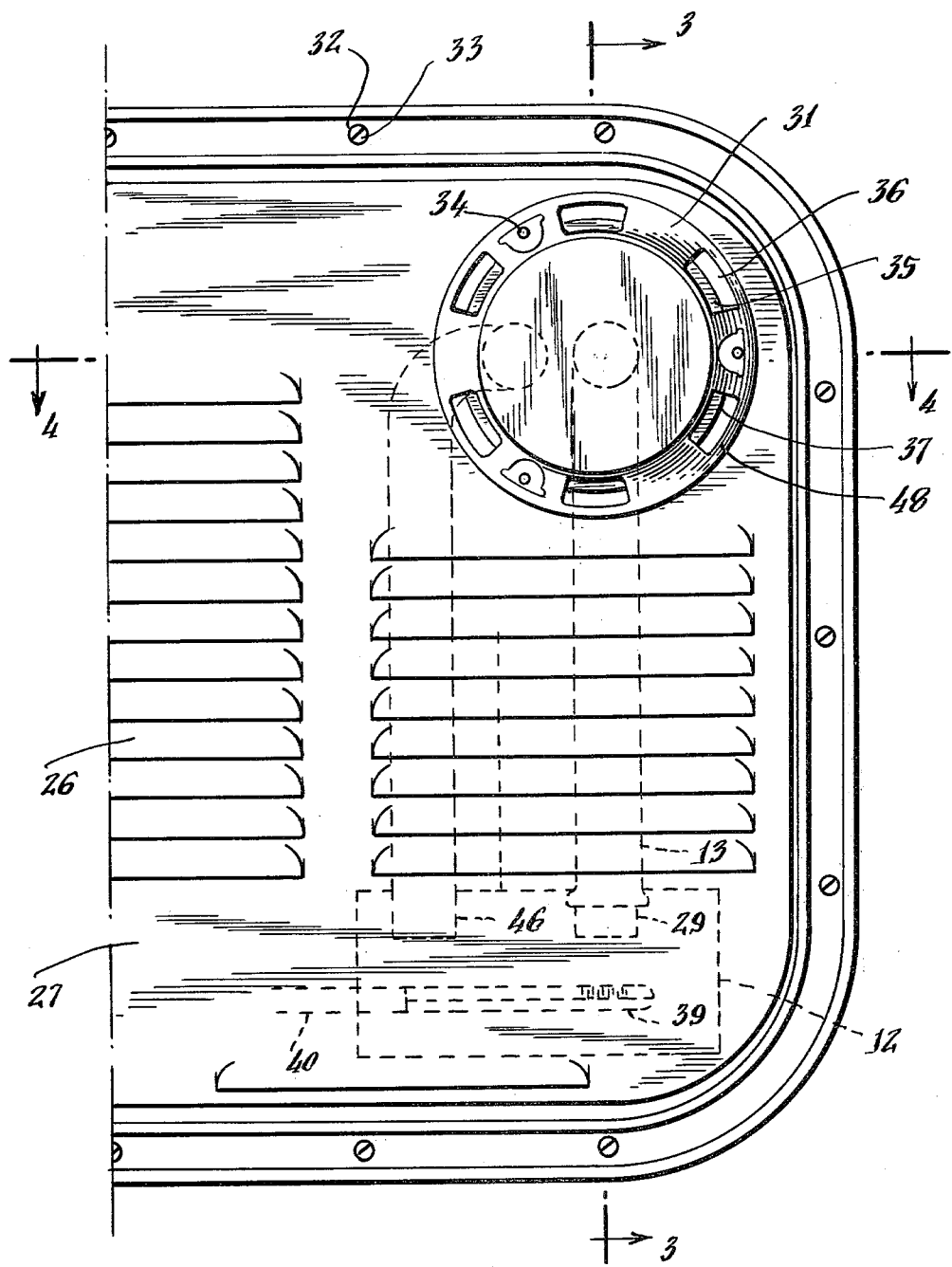
FIG. 2 is an enlarged partial elevational view of a vent louver, as seen from outside.

FIG. 2 shows that part of the door 27 on which the valve 31 is placed. The closed system with the burner is behind the door 27 and is indicated by dashed lines in FIG. 2. The same parts are shown in different sections in FIGS. 3 and 4. The door 27 is fastened to the wall by screws 33 through openings 32 in its frame. The valve 31 is secured to the door by screws 34. The part of the valve which is outside the door has two spaces 35 and 36 separated by a partition 37. The outer space 35 communicates by means of a channel 38 with the flue pipe 29 from the burner which is connected to a gas conduit 40 (FIG. 2). The rearwardly directed part 41 of the flue pipe 29 fits into the channel 38, which has an interposed sealing ring 42. The inner space 36 communicates with a channel 43 including a sealing ring 44 and surrounds a horizontal part 45 of an air conduit 46. The air conduit is bent so as to associate with the valve 31 closely adjacent the flue pipe 29 but goes outside the boiler insulation 13 down to the burner housing 12. The air conduit 46 lies in front of the section plane of FIG. 3 but its lateral position has been indicated by dot-dashed lines. The air conduit is mounted on the refrigerator in the factory and is fixed by means of its lower part, which passes into the burner housing 12, and is by means of a clamp 47 higher up fastened to the wall of the refrigerator 10.

The valve 31 has annularly disposed openings 48 which communicate with the spaces 35 and 36. Thus flowing in of air and flowing out of combustion gases are obtained independently of the direction of wind.

As will be understood from the above, the refrigerator with closed system can be fabricated and assembled in the factory. Correspondingly, the trailer or motor home can be fabricated and assembled in the factory for installation of the refrigerator, as well as the service door with the valved intake and discharge duct.

What is claimed is:

1. In an assembly with a burner-operated refrigerator in a house trailer or the like, said trailer being provided with a service door in an external wall of said trailer adjacent to said assembly, control devices for said refrigerator, a sealed combustion system in the interior of said trailer comprising a boiler pipe having insulation at least about a part thereof, an air intake in said trailer wall, an air conduit from said air intake to said burner, a flue pipe connected to said burner and having heat insulation thereabout, said flue pipe having a heat conductive connection for an associated part of the refrigerator in which refrigerant is expelled and conducted to a gas outlet through said wall of said trailer, the improvement comprising: at least a part of said flue pipe located above said connection on a level below the upper edge of the door provided with a portion that is bent and directed rearwardly out of said heat insulation and is connected to said gas outlet, an air conduit also located on a level below the upper edge of said door and provided with a bent part directed rearwardly and connected to said air intake, and wherein both said air intake and gas outlet are located in said door, and the top of said service door being below the top of said boiler insulation.

2. An arrangement as claimed in claim 1 further comprising a valve in said trailer wall in which said gas outlet and air intake are disposed, and a detachable coupling for connecting said flue pipe and air conduit to said valve.

3. An arrangement as claimed in claim 2 wherein said valve is movable relative to parts of the flue pipe and air conduit respectively.

4. An arrangement as claimed in claim 3 wherein said parts are rearwardly directed from said air conduit and said flue pipe and are concentric at the connection means to said valve.

* * * * *